(12) United States Patent
Watanabe (10) Patent No.: US 8,419,330 B2
(45) Date of Patent: Apr. 16, 2013

(54) CLIP

(75) Inventor: Yasuhiro Watanabe, Toyota (JP)

(73) Assignee: NIFCO Inc., Yokohama-Shi (JP)

( * ) Notice: Subject to any disclaimer, the term of this patent is extended or adjusted under 35 U.S.C. 154(b) by 0 days.

(21) Appl. No.: 12/737,232

(22) PCT Filed: Jun. 24, 2009

(86) PCT No.: PCT/JP2009/061533
§ 371 (c)(1),
(2), (4) Date: Mar. 24, 2011

(87) PCT Pub. No.: WO2009/157488
PCT Pub. Date: Dec. 30, 2009

(65) Prior Publication Data
US 2011/0170982 A1    Jul. 14, 2011

(30) Foreign Application Priority Data

Jun. 24, 2008 (JP) ................. 2008-164270

(51) Int. Cl.
*F16B 13/06* (2006.01)
(52) U.S. Cl.
USPC .............................. 411/45; 411/48
(58) Field of Classification Search ........... 411/45, 411/46, 48; 24/297
See application file for complete search history.

(56) References Cited

U.S. PATENT DOCUMENTS

| 4,403,377 A * | 9/1983 | Mizusawa ................. 24/681 |
| 5,409,336 A | 4/1995 | Jericevich et al. |
| 5,540,528 A * | 7/1996 | Schmidt et al. ............ 411/55 |
| 5,641,255 A * | 6/1997 | Tanaka ....................... 411/48 |
| 5,902,083 A * | 5/1999 | Hwang ....................... 411/48 |
| 6,364,586 B1 | 4/2002 | Okada |
| 6,481,942 B2 | 11/2002 | Tanaka |
| 6,514,023 B2 * | 2/2003 | Moerke ...................... 411/45 |
| 6,769,849 B2 | 8/2004 | Yoneoka |
| 7,413,367 B2 * | 8/2008 | Hawang ................... 403/297 |
| 2002/0001513 A1 | 1/2002 | Tanaka |
| 2002/0176762 A1 | 11/2002 | Moerke |
| 2004/0020016 A1 | 2/2004 | Yoneoka |
| 2008/0031701 A1 | 2/2008 | Boubtane et al. |

FOREIGN PATENT DOCUMENTS

| CN | 2327830 Y | 7/1999 |
| JP | S64-024714 U | 2/1989 |
| JP | U H07-54654 | 12/1995 |

(Continued)

OTHER PUBLICATIONS

Europen Patent Office, "Supplementary European Search Report for EP 09 77 0198", Jan. 16, 2013.

(Continued)

*Primary Examiner* — Gary Estremsky
(74) *Attorney, Agent, or Firm* — Manabu Kanesaka (57) ABSTRACT

A clip includes a pin having at at least a part thereof a non-circular cross-section, and a grommet having an insertion hole into which the pin can be inserted, wherein a part of the grommet is adapted to be expandable by insertion of the pin into the insertion hole. The grommet has slope surfaces provided at an entrance-side hole edge of the insertion hole to lead the pin into the insertion hole when the pin is displaced from a normal position to be in contact with the entrance-side hole edge of the insertion hole.

2 Claims, 9 Drawing Sheets

FOREIGN PATENT DOCUMENTS

| | | |
|---|---|---|
| JP | H08-28529 | 2/1996 |
| JP | 2002-155917 | 5/2002 |
| JP | 2007-56895 | 3/2007 |
| JP | 4060129 | 12/2007 |
| JP | 4067341 B2 | 1/2008 |

OTHER PUBLICATIONS

Chinese Patent Office, "Office Action for CN 200980123996.2", Dec. 3, 2012.

* cited by examiner

CLIP

FIELD OF THE INVENTION

The present invention relates to a clip comprising a grommet and a pin, in particular, to a type of clip, wherein the insertion position of the pin into the insertion hole of the grommet is controlled by the pin's temporary fixing or permanent fixing structure.

DESCRIPTION OF THE RELATED ART

As disclosed in Patent Reference 1, a clip of the invention comprises a pin having at at least a part thereof a noncircular cross-section, and a grommet having an insertion hole into which the pin can be inserted, wherein a part of the grommet is adapted to be expandable by insertion of the pin into the insertion hole, to become the clip in a state of permanent fixing. More specifically, the pin is provided with a head, an axis formed integrally below said head and a rib, i.e. dropping-out prevention protrusion and dropping out prevention piece, formed as protruding from a part of said axis. The grommet is provided with an approximately tubular leg member forming the insertion hole, a flange member circularly protruding from the upper outer periphery of said leg member and a plurality of slits (interspace or clearance gap) disposed in the leg member, which extend from the tip of said leg member to the lower surface area of the flange and has the pin temporarily fixed when the rib fits in the slits.

And for binding or joining adjacent plates, for example, after being inserted into the mounting hole of each plate member in the state of temporary fixing, the leg member being expanded by the axis to be pushed into the cylindrical hole of the leg member by means of push operation of the pin, a clip as described above can fasten or clamp adjacent plates between its flange and the expanded part of its leg member.

PRIOR TECHNICAL LITERATURE

Patent Literature

Patent Reference 1: Japanese Patent No. 4067341

SUMMARY OF THE INVENTION

Problem to be Solved by the Invention

It is cumbersome to handle a pin and a grommet in a state as they are molded. So once they are manufactured, the pin is temporarily fixed to the grommet. The clip, therefore, is transported, controlled and even delivered to an assembly line where it is used in such state of temporary fixing. In many cases, said work of temporary fixing is done by an automatic assembly machine. In such work by the automatic assembly machine, after the grommet is held by the gripping device of the automatic assembly machine, the pin is transferred to the insertion hole of the grommet through position adjustment by a robot hand and the drop prevention protrusion (or rib) on the side of the pin fitting into the slits on the side of the grommet.

Even though such work of temporary fixing by an automatic assembly machine is efficient, if any misalignment between the pin and the grommet or displacement and/or shifting of the insertion position of the pin's dropping-out prevention protrusion with respect to the slits of the leg member on the side of the grommet occurs, it prevents the temporary fixing of the pin, damages the dropping-out prevention protrusion or stops the automatic assembly machine, thus giving rise to deterioration in work efficiency.

The present invention is therefore designed to improve efficiency in the work of temporary fixing by solving the problem as described above by way of improving manual insertability in inserting the pin in the insertion hole of the grommet, thus eliminating the risk of damage in case of misalignment in inserting the pin in the insertion hole by the automatic assembly machine, and adjusting such misalignment by way of transferring the pin or the grommet to a normal position.

Means to Solve the Problem

In order to attain the object, the clip of this invention comprises a pin having at at least a part thereof a noncircular cross-section, and a grommet having an insertion hole into which the pin can be inserted, wherein a part of the grommet is adapted to be expandable by insertion of the pin into the insertion hole and that the grommet has a ramp provided at an entrance-side hole edge of the insertion hole and leading the pin into the insertion hole when the pin is displaced from a normal position to a position contacting the entrance-side hole edge of the insertion hole.

It is more preferable to embody the clip of this invention described as above in a manner as set forth in (a)-(d) below.
(a) The ramp is configured so that, when the pin and the grommet are subjected to a stress in a direction approaching each other, the pin or the grommet is rotated around the center axis of the opposite member.
(b) The pin is configured so that it has a head member, an axis member having an approximate circular cross-section below said head member which is formed integrally with said head member and a rib protruding from a part of said axis member, which acts to effect temporary or permanent fixing of said pin.
(c) The grommet is configured so that it has an approximately tubular leg member forming the insertion hole, a flange member circularly protruding from the upper outer periphery of said leg member and a plurality of slits disposed in the leg member which extend from the tip of said leg member to the bottom surface area of the flange, and that it has the pin temporarily fixed to it when the rib fits in the slits.
(d) The ramp is configured so that the ramp is disposed in the entrance-side hole edge of the insertion hole, is located at an upper portion of each leg piece defined between the slits and forming the leg member, and inclines from a position corresponding to an approximate intermediate portion between adjacent slits located on both sides of the leg piece toward the slits on both sides, or from a position corresponding to either of the slits located on both sides of the leg piece toward the other.

In a work of temporary fixing, when a pin comes to contact with the entrance-side hole edge of the insertion hole displacing from a normal position, because the pin is led from the entrance-side hole edge of the insertion hole to inside of the insertion hole by means of the induction action of a ramp formed in the entrance-side hole edge of the insertion hole, the present invention can solve a problem as mentioned in the above "Problem to be Solved by the Invention." That is to say, even though insertion of a non-circular pin into the insertion hole of the grommet requires an advance position adjustment of the pin to the configuration of the insertion hole before the pin is inserted thereinto, the present invention can skip position adjustment or provide ease position adjustment and can thus improve such work of temporary fixing by leading the pin to a normal position by means of induction action of the ramp formed in the entrance-side hole edge of the insertion hole even when the insertion position of the pin is displaced from a normal position in some degree.

When it is configures so that when the pin and the grommet are subjected to a stress in the proximity direction, the pin or the grommet is rotated around the central axis of the opposite member, for example, in case that the pin and the grommet are subjected to a stress in the proximity direction when the insertion position of said pin is being displaced from a normal position in some degree, the pin or the grommet is led to the normal position while being rotated around the central axis of the opposite member by means of the induction action of the ramp formed in the entrance-side hole edge of the insertion hole. The ramp is therefore particularly preferred for effecting temporary fixing by the automatic assembly machine.

When it is configured so that it has a head member, an axis member having an approximate circular cross-section below said head member which is formed integrally with said head member and a rib protruding from a part of said axis member, which acts to effect temporary or permanent fixing of said pin, the pin can be provided with the advantageous effect of this invention even if the pin is a conventional pin.

In contrast, when it is configured so that it has the approximately tubular leg members forming the insertion hole, a flange member circularly protruding from the upper periphery of said leg members and a plurality of slits in the leg members extending from the tip of said leg members to the lower surface area of the flange, and that it has the pin temporarily fixed to it when the rib fits in the slits, the grommet can be provided with the advantageous effect of this invention while maintaining the same configuration as that of a conventional product except for the ramp being disposed in the entrance-side hole edge of the insertion hole.

When it is configured so that the ramp is disposed in the entrance-side hole edge of the insertion hole, is located at an upper portion of each leg piece defined between the slits and forming the leg member, and inclines from a position corresponding to an approximate intermediate portion between adjacent slits located on both sides of the leg piece toward the slits on both sides, or from a position corresponding to either of the slits located on both sides of the leg piece toward the other, because as shown in FIG. 3, there is a low inclination from a position lying above each leg piece divided up between the adjacent slits and corresponding to an approximate intermediate position between the adjacent slits located on both sides of the leg piece toward the slits on both sides, or because as shown in FIG. 9, there is a low inclination from a position corresponding to either of the slits located on both sides of the leg piece toward the other slit, the ramp of this invention can attain its object by means of a non-complicate configuration.

BRIEF DESCRIPTION OF THE DRAWINGS

FIG. 3 shows chief parts, wherein

FIG. 5 shows the details of the grommet, wherein

FIG. 6(a) is a C-C line cross section view of FIG. 5(a) and FIG. 5(b) is a B-B line cross section view of FIG. 5(a).

FIG. 7 shows the details of said pin, wherein

FIG. 8 shows a modified example of said pin, wherein

FIG. 9 shows an example of a variation of the details in contrast to FIGS. 3(a) and 3(b), wherein

EMBODIMENTS FOR CARRYING OUT THE INVENTION

Figure 4A:
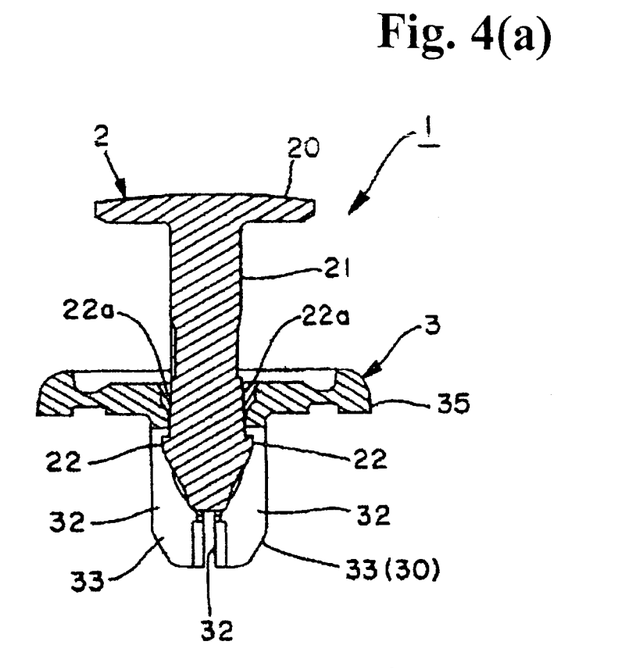
FIG. 4(a) is a longitudinal sectional view showing the clip in a state of temporary fixing.
Figure 4B:
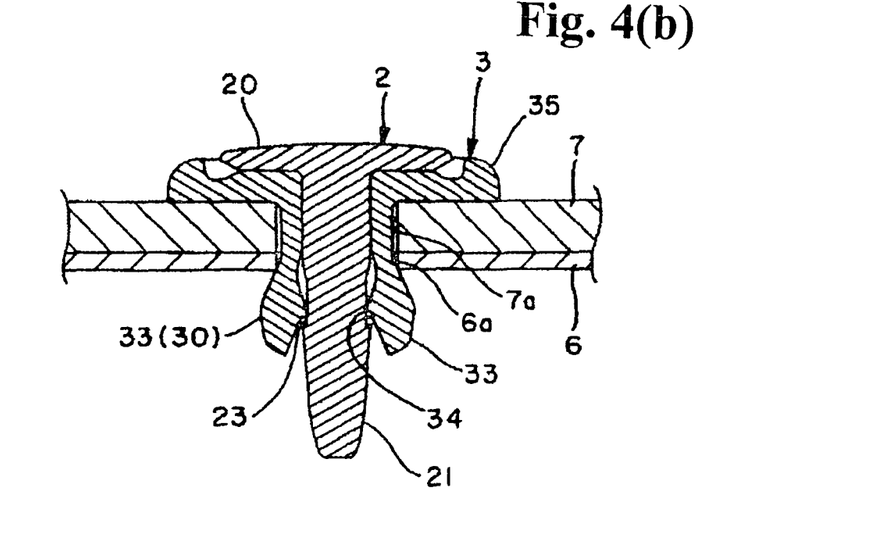
FIG. 4(b) is a longitudinal sectional view showing the clip in a state of permanent fixing.
Figure 5A:
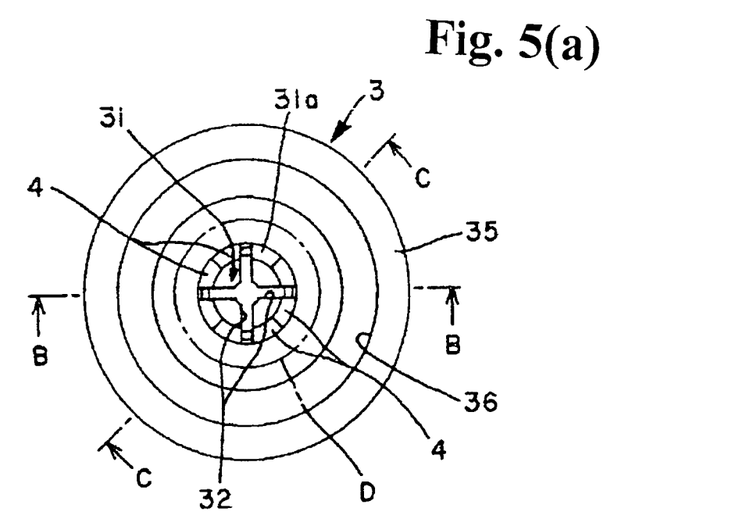
FIG. 5(a) is a plan view.
Figure 5B:
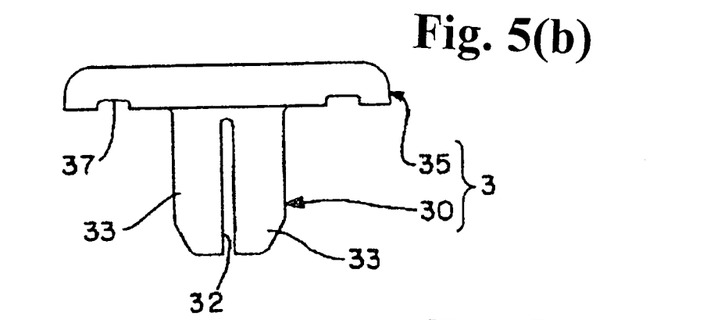
FIG. 5(b) is a front view.
Figure 5C:
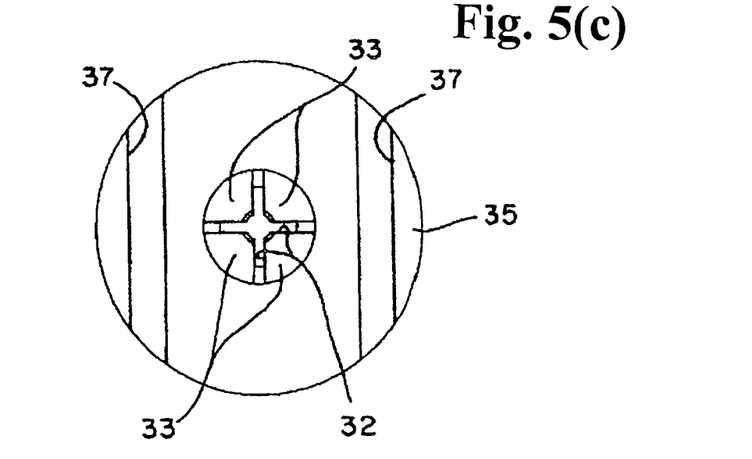
FIG. 5(c) is a bottom view.
Figure 6A:
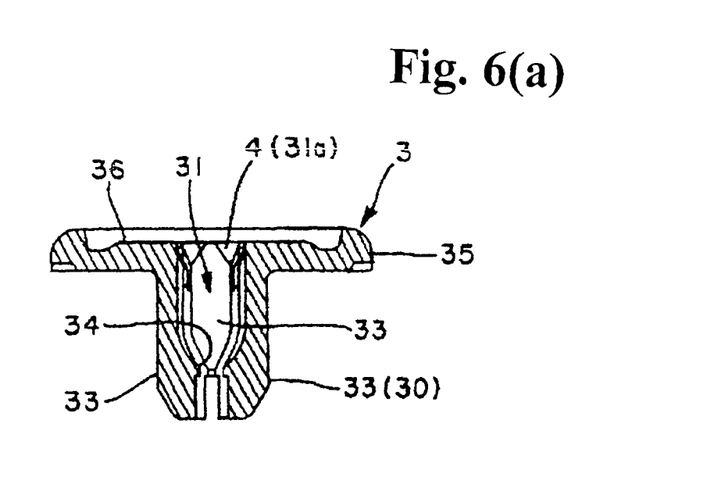
Figure 6B:
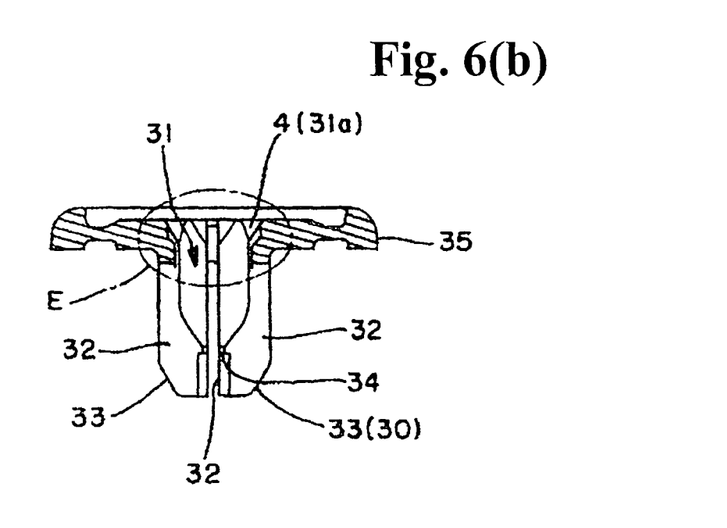

Now, optimal embodiments for carrying out the invention are described herewith reference to the drawings. The following description is made in details in the order of the drawings, from FIG. 1(a)-FIG. 7(d) concerning the clip configuration, and actuations to FIGS. 8(a)-8(d) and FIGS. 9(a) and 9(b) each concerning a modified example respectively. In FIG. 4(a), the pin corresponds to the cross section view looking in the direction of the arrow F-F of FIG. 7(c), and the grommet corresponds to the cross section view looking in the direction of the arrow B-B of FIG. 5(a). In FIG. 4(b), the pin corresponds to the cross section view looking in the direction of the arrow G-G of FIG. 7(d) and the grommet corresponds to the cross section view looking in the direction of the arrow C-C of FIG. 5(a). In the grommet of FIGS. 6(a) and 6(b), FIG. 6(a) corresponds to the cross section view looking in the direction of the arrow C-C of FIG. 5(a), and FIG. 6(b) corresponds to the cross section view looking in the direction of the arrow B-B of FIG. 5(a).

(Clip configuration) As in a conventional product as presented in Patent Reference 1, a clip 1 of the embodiment is composed of a pin 2 having at at least a part thereof a noncircular cross-section and a grommet 3 having the insertion hole 2 into which said pin 2 can be inserted, wherein a part of the grommet is adapted to be expandable by insertion of the pin into the insertion hole. For example, a clip of a type of the embodiment can be used to mount a plate member 6 on a plate member 7 or to fasten a plurality of plate members 6, 7 into a laminated state. The pin 2 and the grommet 3 are both resin molded products.

Figure 7A:
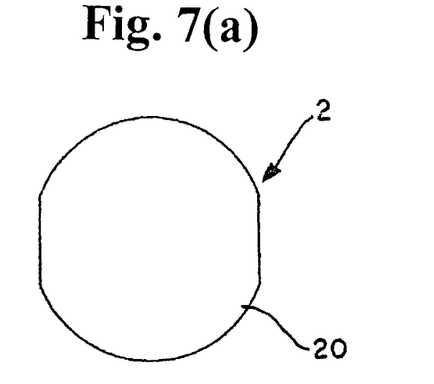
FIG. 7(a) is a plan view.
Figure 7B:
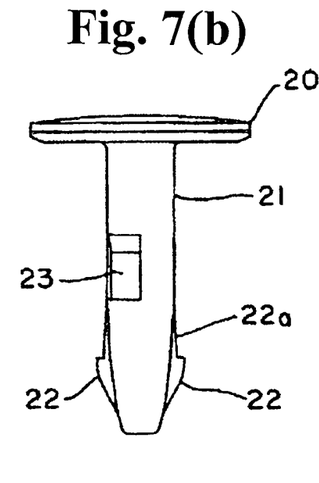
FIG. 7(b) is a front view.
Figure 7C:
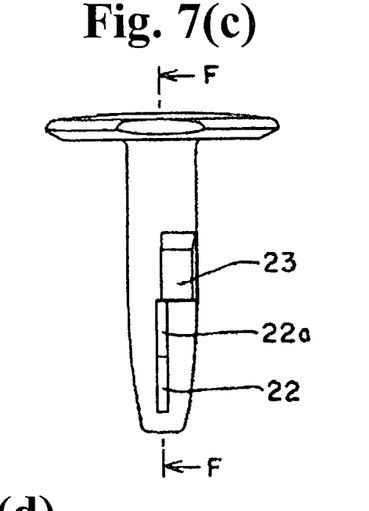
FIG. 7(c) is a side view.
Figure 7D:
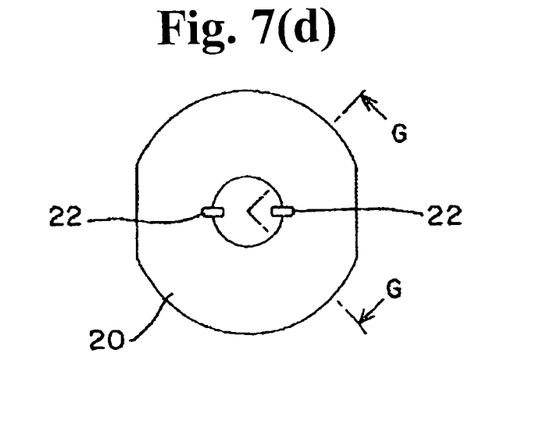
FIG. 7(d) is a bottom view.
Figure 8A:
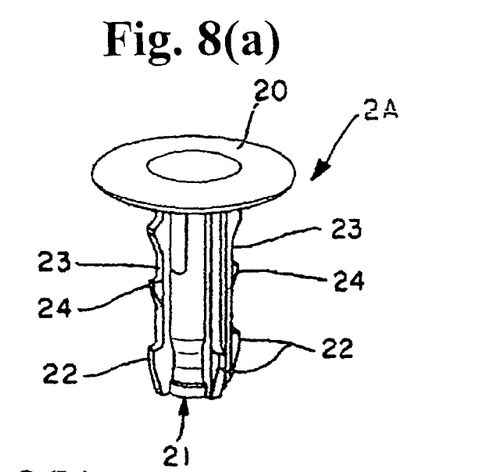
FIG. 8(a) is a diagrammatic perspective view.
Figure 8B:
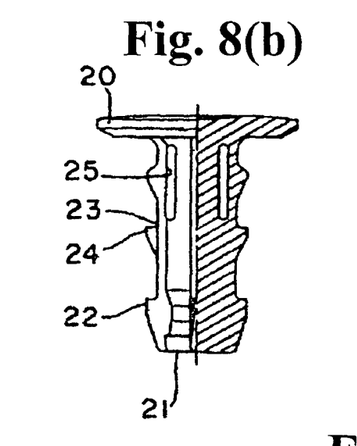
FIG. 8(b) is a half section of a front view.
Figure 8C:
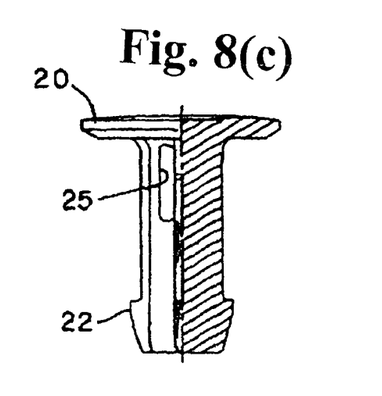
FIG. 8(c) is a half section of a side view.
Figure 8D:
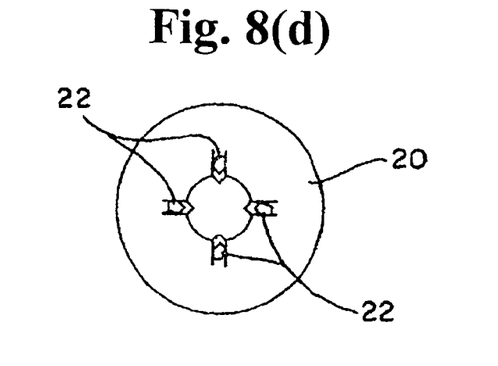
FIG. 8(d) is a bottom view.

The pin 2 here comprises a head member 20 and an axis member 21 which is formed integrally with the head member 20 thereunder. The head member 20 is generally circular in outline. The axis member 21 is formed to protrude from the center of the bottom portions of the head member 20 and has a rib 22 for temporary fitting formed integrally therewith and protruded from the periphery thereof just a little short of the tip end and a step member for permanent fitting disposed in the periphery just above the rib 22. The tip end of the axis member 21 is slightly smaller in diameter. As shown in FIGS. 7(b) and 7(c), the rib member 22 and the step member 23 are located in the periphery of the axis and are disposed at their respective positions angularly displaced from each other by 180 degrees about the periphery of the axis. The rib 22 is a member which enables the below described pin 2 to be temporarily fitable into the grommet 3 and is formed with the overhanging amount increased gradually following the direction from bottom up. The step member 3 has a form by making a part of the periphery of the axis member 21 concave or uneven, and is a member which enables the below-described pin 2 to be permanently fitable into Grommet 3.

The symbol marked 22a is a rib for temporary holding, which extends from a position close to the step member 23 to the edge face of the dump of the rib 22 and is configured such that its overhanging amount is less than that of the rib 22 while increasing a little following the direction from top down. As shown in FIG. 4(a), the pin 2 is temporarily held in a state wherein it is temporarily fitted in the grommet 3 due to the existence of the rib 22a.

The grommet 3 has an elastic leg member 30 and a flange member 35. The elastic leg member 30 is generally tubular in shape and integrally forms the projection of the flange member 35 around the upper limit outer periphery. Further, the elastic leg member 30 forms an insertion hole 31 which is passed through its cylindrical space up and down and is divided up into four leg pieces 33 by the four vertical slits 32 which are disposed equally spaced around said cylindrical space and extending in the axial direction respectively. Through the tapered member inside the cylindrical hole facing downward unto the upper inner side, each leg piece 33 forms a claw 34 while leaving a minimum clearance between the adjacent claws. The flange member 35 has concave member 36 which receives a side of the pin's head member 20 and a plurality of shallow grooves 37 disposed in the bottom surfaces thereof.

Further, in this configuration, there is provided a ramp 4 which leads the pin 2 into the entrance-side hole edge 31a of the insertion hole 31 when the pin 2 is displaced from a normal position to contact with the entrance-side hole edge of the insertion hole. As can been seen from the enlarged drawings of FIGS. 3(a) and 3(b), the ramp 4 is configured such that it is disposed in the upper interior surface of each of the leg pieces 33 which are located in the entrance-side hole edge 31a and are divided up between the adjacent slits 32, and that there is a low inclination from the intermediate position between the adjacent slits 32 located on both sides of the leg piece 33 toward the slits 32 on both sides. That is to say, the ramp 4 in the modified example is located in the entrance-side hole edge 31a of the insertion hole 31, and forms a unit with the upper interior surface of each leg piece 33 divided up between adjacent slits 32 (therefore, units thereof amount to four), and there being provided two such units in the upper interior surface of each of said units, the ramp 4 of the modified example comprises a total of four units. Each ramp 4 is configured such that, in the upper interior surface of each of said units, with the intermediate position in the circumferential direction taken as the boundary line, there is the boundary line at 4a in the higher side and the boundary line inclines looking from the higher side 4a toward the slits 32 on both sides at 4b in the lowest side.

(Operation) The clip 1 becomes temporarily fixed when the axis member 21 of the pin is inserted in the insertion hole 31 on the side of the leg member of the grommet 3 and each rib 22 becomes engaged with the slit 32 on the side of the leg member of the grommet 3 as shown in FIG. 4(a), while the clip 1 becomes permanently fixed when the pin 2 is farther inserted to make each leg piece 33 expanded and the claw 34 of the leg piece 33 engaged with the step of, the step member 23 of the axis. In a state of temporary fixing, the pin 2 has its axis member prevented from dropping-out by each rib 22 with respect to the insertion hole 31 of the leg member, and is held in a state of temporary fixing wherein the pin protrudes for a predetermined distance from above grommet 3 due to the existence of the rib 22a which is moderately pressed to the insertion hole 31 as shown in FIG. 4(a). Further, in a state wherein the leg member 30 of the grommet is inserted into the fitting holes 6a, 7a of the plate members 6, 7 as shown in FIG. 4(b), by clamping the plate members 6, 7 between the flange 35 and the expanded part of each leg piece 33, the clip 1 can fix the plate member 7 (for example, a plate member on the side of a product) to the plate member 6 including plates for housing or panels or can fasten together adjacent the plate members 6, 7. This actuation is the same as or similar to that of a conventional clip.

Further, in this configuration, with respect to the work of the temporary fixing as described in "Problem to be Solved", the following operation can be obtained when the temporary fixing is done by an automatic assembly machine. That is to say, in the automatic assembly, for example, after the grommet 3 is rotationally held to the gripping device on the side of the automatic assembly machine, each rib 22 fits into the corresponding slit 32 when the pin 2 is transferred to the insertion hole 31 on the side of the grommet while the position being adjusted by a robot hand. In the automatic assembly like this, the robot hand holds the pin 2 by way of the head member 35, but its holding angle or position may sometimes shifts by one reason or another. In such a case, however, according to this configuration, when the pin 2 is displaced from a normal position to contact the entrance-side hole edge 31a of the insertion hole 31, while being transferred from the higher ramp 4a to the lower ramp 4b by the guiding action of the ramp 4 (which is one of a plurality of ramps 4 disposed in the entrance-side hole edge 31a of the insertion hole 31 as shown in FIG. 2(a)-FIG. 3(b)) with which the rib 22 of the pin's axis contacts, the pin 2 is led into the insertion hole 31.

That is to say, in this example, when the pin 2 is transferred downwards from a state as shown in FIG. 2(a)-FIG. 3(b), after the rib 22 coming into contact with the corresponding ramp 4, the grommet 3 is being rotated around the central axis of the pin 2 (this rotation being a rotation from the higher 4a to the lower 4b) to be fitted into the corresponding slit 32 (at 4b in the lower side), the pin 2 becomes temporarily fixed as described above. Therefore, in case of a different configuration wherein the grommet 3 is held and fixed unto the gripping device etc., of the automatic assembly machine and the pin 2 is rotationally held by the robot hand etc., when the pin 2 is transferred downwards from a state of FIGS. 2(a) and 2(b), after the rib 22 comes into contact with the corresponding ramp 4 with the pin 2 rotating around the central axis of the grommet (this also being a rotation from the higher side 4a toward the lower side 4b), the pin 2 becomes fitted into the corresponding slit 32 (located in the lower side 4b) and becomes temporarily fixed as described above. Therefore, in this configuration, by the induction action of the ramp 4 disposed in the entrance-side hole edge 31a of the insertion hole of the grommet, the pin 2 can be led to a normal position even if its insertion position is displaced in some degree, so that the position adjustment or alignment can be skipped or eased and the workability of temporary fixing can thus be improved.

(Modified example 1) FIGS. 8(a)-8(d) show a modified example of the pin of the embodiment, wherein the same member thereof as that of the former embodiment is given the same number as that used in the embodiment. In this description, only changes are described in detail. That is to say, the pin 2A differs from the pin 2 in that the rib 22 for the temporary fixing comprises a total of four pieces disposed at an intermediate position of the axis periphery, that the step member 23 for the permanent fixing is formed by the end surface of the protrusion 24 just above the two ribs 22 disposed in a position on the periphery of the axis member 21 displaced therefrom by 180 degree, and that the pin 2a has the slit 25 for providing elasticity which is disposed in the upper side of the axis member and passing through in the across-the-width direction. In essence, as for the grommet 3, there exist a configuration combined with the pin 2 and a configuration combined with the pin 2A, the grommet being designed to serve for both pin 2 and pin 2A.

Figure 1A:
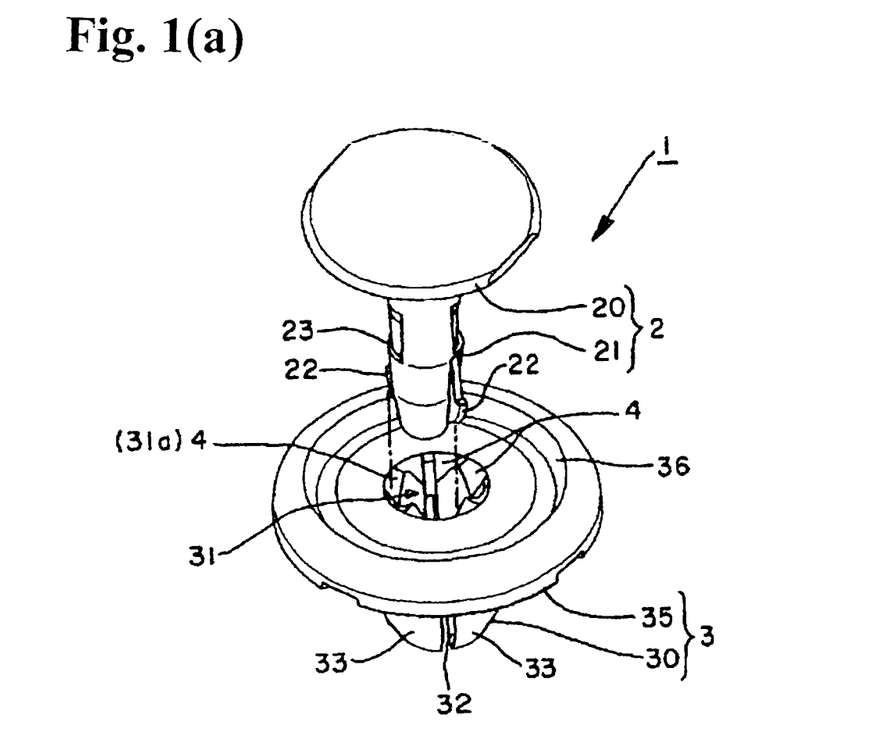
FIGS. 1(a) and 1(b) are respectively a perspective view showing a state wherein the pin used in the clip is found before being inserted in the insertion hole of the grommet, and a perspective view showing a state wherein the pin is found just before the insertion is commenced.
Figure 1B:
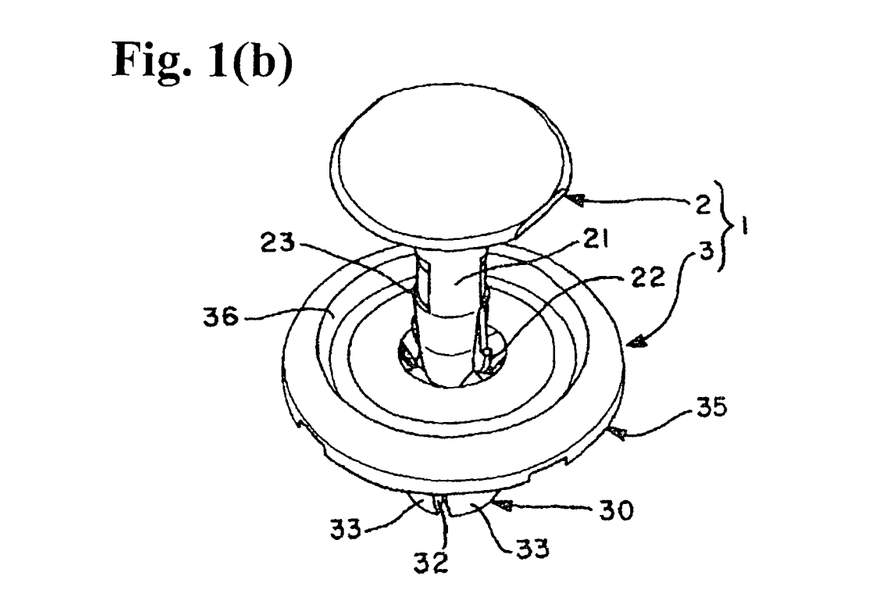
Figure 2A:
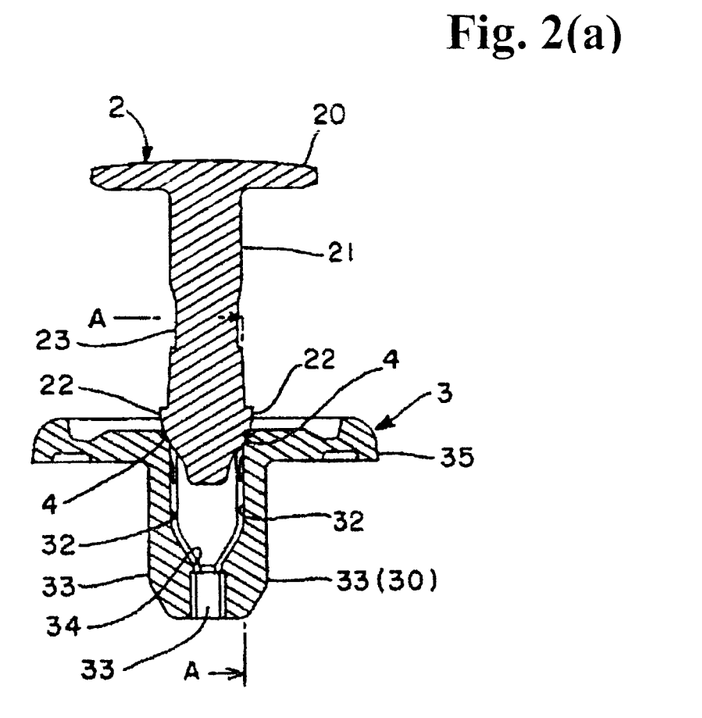
FIG. 2(a) is a longitudinal sectional view showing the clip in the same status as in FIG. 1(b)
Figure 2B:
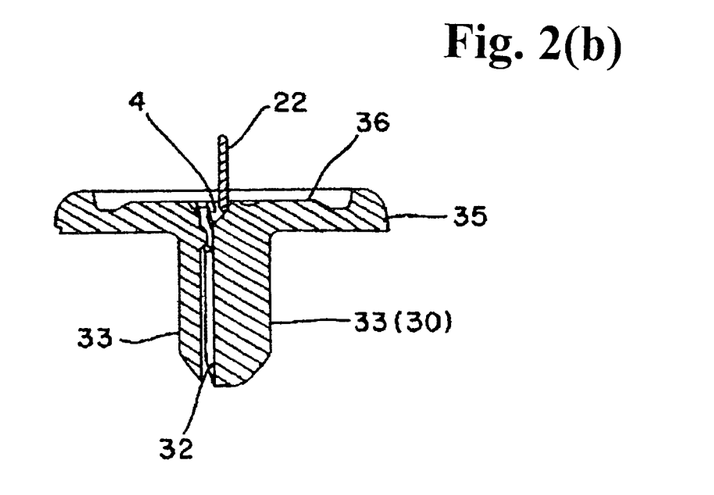
FIG. 2(b) is an A-A line cross-section view of FIG. 2(a).
Figure 3A:
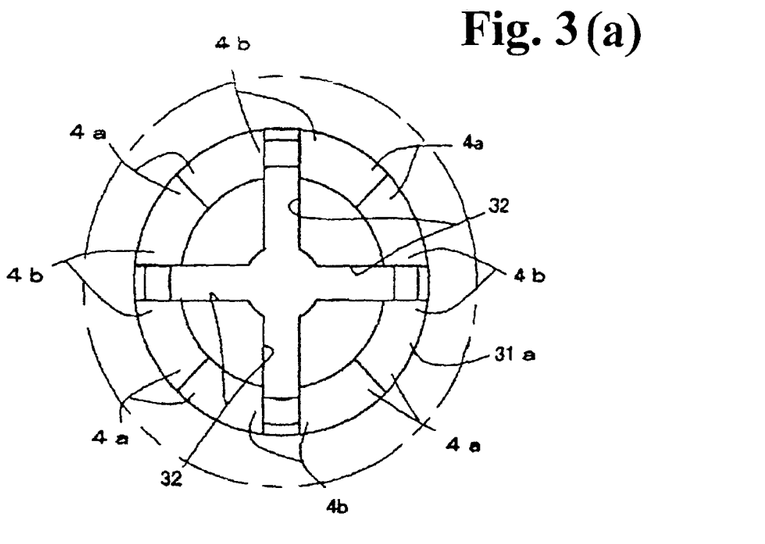
FIG. 3(a) is an enlarged drawing of D portion of FIG. 5(a) and FIG. 3(b) is an enlarged drawing of E portion of FIG. 6(b).
Figure 3B:
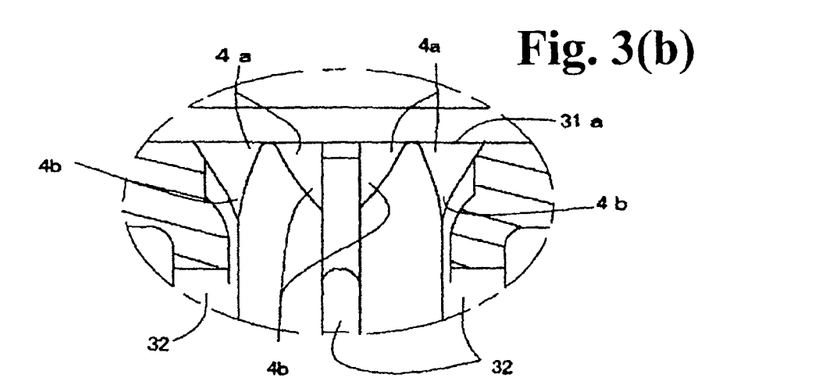
Figure 9A:
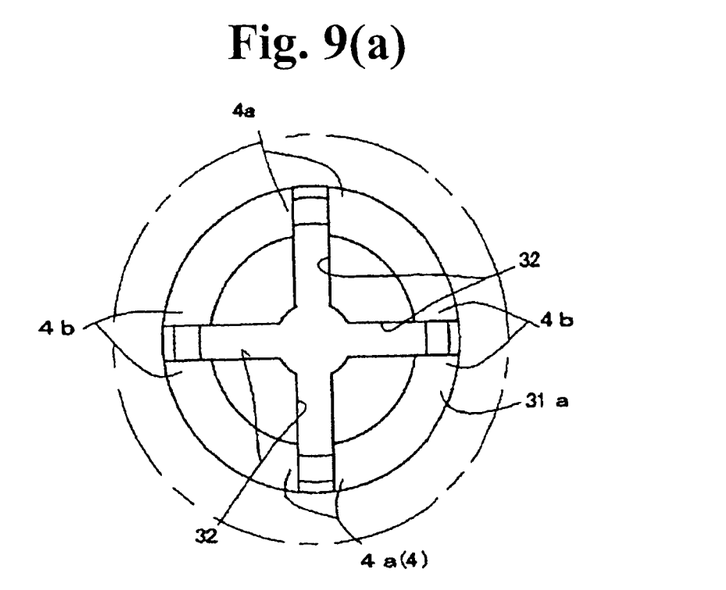
FIG. 9(a) is an enlarged drawing in contrast to D portion of FIG. 5(a)
Figure 9B:
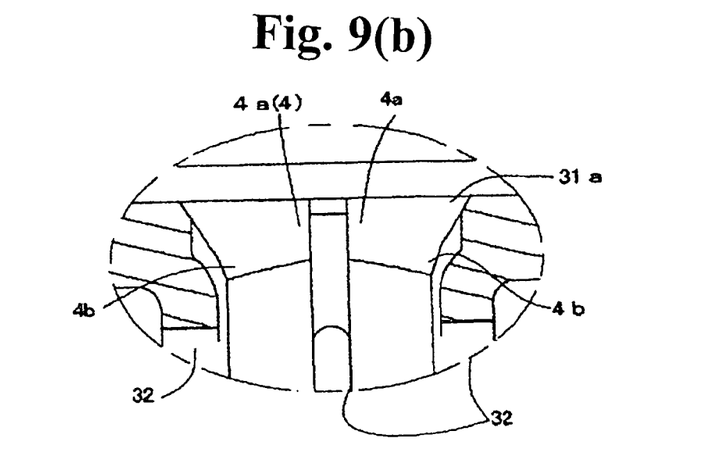
FIG. 9(b) is an enlarged drawing in contrast to E portion of FIG. 6(b).

(Modified example 2) FIGS. 9(a) and 9(b) show a modified example of the ramp of the grommet side in contrast to FIGS. 3(a) and 3(b), wherein the same member thereof as that of the embodiment is given the same number as that used in the embodiment. In this description, only changes are described in detail. That is to say, in the same manner as in the embodiment, the ramp 4 here is designed to lead the pin 2 to the insertion hole 31 when the pin 2 is displaced from a normal position to the entrance-side hole edge 31a of the insertion hole 31. The ramp 4 is formed in the entrance-side hole edge 31a, and is disposed in the upper interior surface of each leg piece 33 divided between the adjacent slits. The ramp 4 has a low inclined configuration from one slit 32 to the other slit on both sides of the leg piece 33.

That is to say, the ramp 4 is located in the entrance-side hole edge of the insertion hole 31, and the upper interior surface of each leg piece 33 divided between the adjacent slits is taken as a unit. The ramp 4 is formed in the upper interior surface, and the ramp 4 of the modified example comprises a total of four units. Each ramp 4 is configured such that, in the upper interior surface of each of the units and in looking in the same direction as the other, there is disposed one slit 32 at the higher side 4a and there is an inclination from the higher side 4a toward the other slit 32 at the lowest side 4b. As the same kind of actuation as that of the embodiment can also be obtained even by this ramp configuration as seen in the above, the clip 1 of this invention needs to be provided only with such configurations as to, be specified in the claims below, while details thereof can be changed one way or another as necessary.

The entire disclosure of the specification, claims, summary and drawings of Japanese Patent Application No. 2008-164270 is herein incorporated by reference in its entirety.

What is claimed is:

1. A clip comprising:
a pin having at at least a part thereof a noncircular cross-section and
a grommet having an insertion hole into which the pin can be inserted, a part of the grommet being partly expandable by insertion of the pin into the insertion hole,
wherein the grommet has a ramp provided at an entrance-side hole edge of the insertion hole and leading the pin into the insertion hole when the pin is displaced from a normal position and contacts the entrance-side hole edge of the insertion hole,
the pin includes an axis member having a rib protruding outwardly from a surface of the axis member,
the grommet includes a leg member having a plurality of leg pieces and a plurality of slits provided respectively between the plurality of leg pieces, the rib being rotated and guided by the ramp to a position where the pin is temporarily fixed when the pin is deviated from the normal position and inserted into the insertion hole, and
the ramp inwardly extends from the entrance-side hole edge and inclines toward the slit inside the insertion hole.

2. A clip comprising:
a pin having at at least a part thereof a noncircular cross-section; and
a grommet having an insertion hole into which the pin can be inserted, a part of the grommet being partly expandable by insertion of the pin into the insertion hole,
wherein the grommet has a ramp provided at an entrance-side hole edge of the insertion hole and leading the pin into the insertion hole when the pin is displaced from a normal position and contacts the entrance-side hole edge of the insertion hole;
the pin includes a head member, an axis member having an approximate circular cross-section below the head member which is formed integrally with the head member, and a rib protruding from a part of the axis member, which acts to effect temporary or permanent fixing of said pin;
the grommet includes an approximately tubular leg member forming the insertion hole, a flange member circularly protruding from an upper outer periphery of said leg member, and a plurality of slits disposed in the leg member and extending from a tip of said leg member to a bottom surface area of the flange member, said pin being temporarily fixed when the rib fits in the slits; and
the ramp is disposed in the entrance-side hole edge of the insertion hole, is located at an upper portion of each leg piece defined between the slits and forming the leg member, and inclines from a position corresponding to an approximate intermediate portion between adjacent slits located on both sides of the leg piece toward the slits on both sides, or from a position corresponding to either of the slits located on both sides of the leg piece toward the other.

* * * * *